Jan. 17, 1928.

K. O. B. TEXTORIUS 1,656,612

CARRIAGE AND BEAD RING HOLDER FOR TIRE BUILDING CORES

Filed Oct. 16, 1924   3 Sheets-Sheet 1

INVENTOR
Knut O. B. Textorius
BY C. P. Goepel
his ATTORNEY

Jan. 17, 1928. 1,656,612
K. O. B. TEXTORIUS
CARRIAGE AND BEAD RING HOLDER FOR TIRE BUILDING CORES
Filed Oct. 16, 1924 3 Sheets-Sheet 2

INVENTOR
Knut O. B. Textorius
BY C. P. Goepel
his ATTORNEY

Patented Jan. 17, 1928.

1,656,612

UNITED STATES PATENT OFFICE.

KNUT O. B. TEXTORIUS, OF NEW YORK, N. Y.

CARRIAGE AND BEAD-RING HOLDER FOR TIRE-BUILDING CORES.

Application filed October 16, 1924. Serial No. 743,895.

This invention relates to an improved carriage and bead ring holder for tire building cores and has for one of its objects to provide means for mounting or supporting a core for free rolling movement which is more particularly designed for use in connection with a new method and machine for building cord tires which is fully described and claimed in my co-pending application for patent, filed October 8, 1924, Serial No. 742,292. As disclosed in said application, the core upon which the tire structure is to be built is supported by a traveling carriage for free rolling movement upon a layer or lamination of tire building material which is automatically folded around and upon the core surfaces and properly tensioned during such rolling movement of the core. After a predetermined number of layers of the tire building material have thus been applied to the core, suitable bead rings are applied to the edges of the superposed layers of material.

One of the important objects of the present invention is to provide a tire supporting carriage which is of simple construction and whereby the tire forming core may be very easily and quickly mounted upon said carriage or removed therefrom. Another important feature of the carriage construction is to provide suitable means whereby lifting hooks may be readily connected with the carriage when the core is disposed either in a vertical or horizontal plane for the purpose of transporting the same from place to place.

It is another object of my present improvements to provide means for supporting bead rings upon the carriage at opposite sides of the core whereby they may be readily applied to the superposed laminations of tire building material, without necessitating the lifting or removal of the core and its carriage from the supporting rails upon which the carriage is mounted.

With the above and other objects in view, the invention consists in the improved core carriage and bead ring holder or support, as will be hereinafter more fully described, illustrated in the accompanying drawings and subsequently incorporated in the subjoined claims.

In the drawings wherein I have illustrated a simple and practical embodiment of my present improvements and in which similar reference characters designate corresponding parts throughout the several views.

Figure 1:
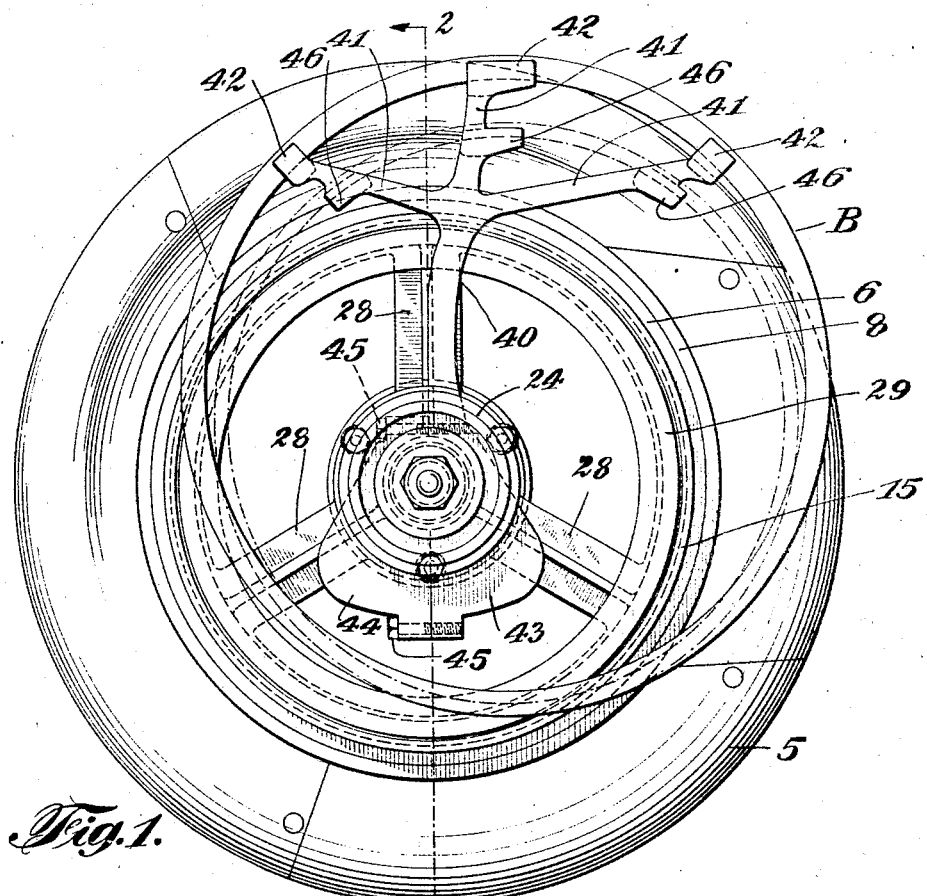
Figure 1 is a side elevation showing the core mounted in the supporting carriage and a bead ring arranged upon the holder or support.

In the drawings, for purposes of illustration, I have shown a tire building core or mandrel which may correspond in a general way with the core structure shown and described in Patent No. 1,408,044, granted to me on February 28th, 1922. However, in the use of such core in connection with my new method and machine for building cord tires, as shown in the co-pending application previously referred to, I provide the body of the core adjacent the flanges 6 thereof with the shallow grooves or channels 7 to receive the rings 8. Each ring 8 is provided in its inner face with one or more seats indicated at 9 for the balls 10 arranged in pockets 11 provided in the flanges 6 and urged outwardly by the springs 12. The holding action of the balls 10 is sufficient to prevent axial displacement of the rings 8 from their applied positions on opposite sides of the core, and yet permit of their easy removal.

The inner faces of the core flanges 6 are beveled or inclined as indicated at 13 and between these flanges the core is formed with a relatively deep circumferential groove or channel 14. The several sections comprising the core 5 are retained in assembled relation by means of the locking ring 15 as dscribed in my issued patent above referred to.

The mandrel or core structure above described is mounted upon a traveling carriage. This carriage includes the two axle or shaft sections 16 and 17, respectively. One end of the shaft section 17 is diametrically enlarged to provide an annular shoulder 18 thereon, said enlarged end of the shaft section having a bore or recess 19 therein to receive the end 20 of the other shaft section 16. This latter shaft section is provided with a flange or a collar 21. In spaced relation to this collar 21, the shaft section 16 is provided with a threaded portion 22 and the shaft section 17 has a similar threaded portion 23 spaced from the shoulder 18 thereof.

A flanged wheel 24 provided with roller bearings 25 is mounted upon the other end of each shaft section and is adapted to travel upon suitable supporting rails (not shown). Between these wheels and the threaded portions 22 and 23 of the respective shaft sections, roller bearings 26 are arranged and are adapted to be engaged by moving parts of the machine whereby a traveling movement is imparted to the carriage.

Upon the portion of each shaft section between the threads 22, 23 thereof, and the collar 21 and shoulder 18, respectively, a core clamping head is engaged. Each of these clamping heads has a hub portion 27 connected by a plurality of radially disposed arms or spokes 28 with a rim 29. The outer face of this rim at one edge thereof is provided with a beveled circumferential surface 30 for frictional wedging engagement with the beveled surface 13 on one of the core flanges 6. At its opposite edge the rim 29 is curved or bent inwardly to provide flanges 31 with which lifting hooks may be engaged. Each rim is also provided on its outer face with an annular stop shoulder 32 for engagement with the core flange 6.

Figures 3, 4:
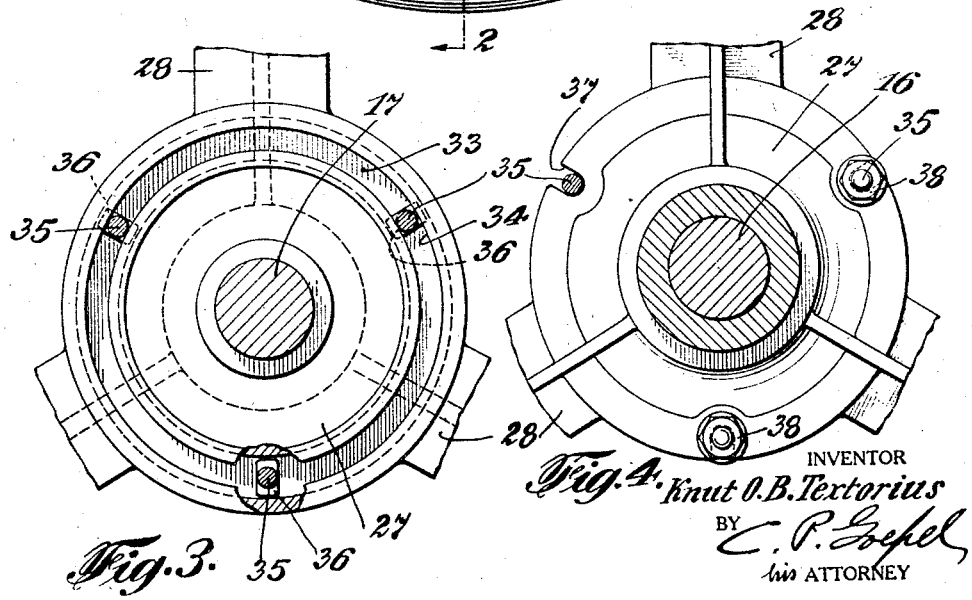
Figure 3 is a detail section on an enlarged scale taken on line 3—3 of Figure 2.
Figure 4 is a similar section taken on the line 4—4 of Figure 2.
Figure 2:
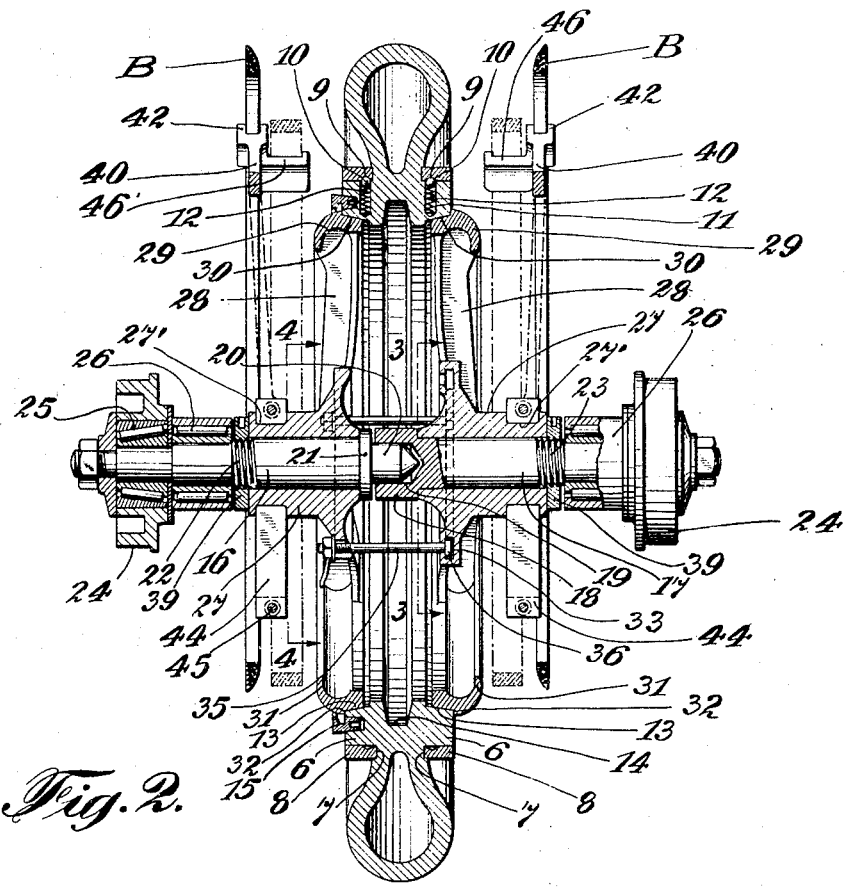
Figure 2 is a sectional view taken on the line 2—2 of Figure 1.
Figure 5:
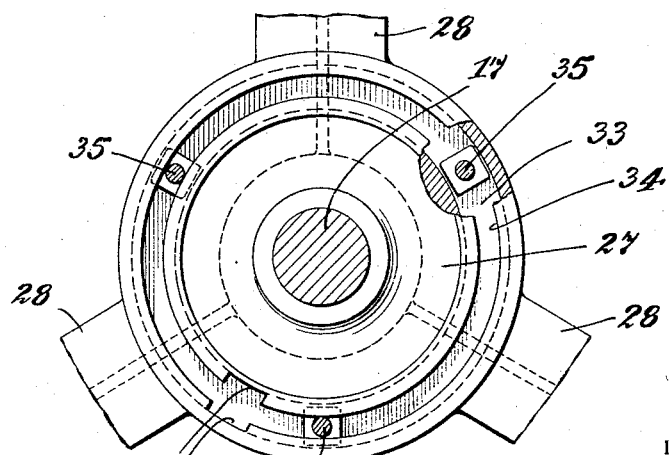
Figure 5 is a sectional view similar to Figure 3, showing a slightly modified form of one of the details.

As shown in Figure 3 of the drawings, the hub 27 on one of the clamping heads is formed with an annular channel 33, the inner wall of said channel having a relatively narrow annular slot 34 therein providing flanges at the opposite sides of said slot. A plurality of connecting bolts 35 have rectangular heads 36 on one of their ends slidably engaged in the channel 33, the other ends of said bolts being threaded and detachably seated in notches or recesses 37 formed in the periphery of the hub 27 of the other core clamping head. Suitable nuts 38 are threaded upon the ends of said bolts and by adjusting said nuts, the core clamping heads may be drawn towards each other upon the respective shaft sections so as to frictionally bind their circumferential faces 30 against the inclined surfaces 13 of the core flanges 6, as will be readily understood. Collars 39 are engaged upon the threaded portions 22 and 23 of the respective shaft sections and are adjusted against the outer ends of the hubs 27. In this manner, the two clamping heads are rigidly fixed upon the respective shaft sections and also securely clamped against the core flanges 6 so as to secure the core against relative rotational movement with respect to said clamping heads. The two shaft sections may thus rotate as a unit in the rolling movement of the carriage wheels 24 upon the track rails.

After a predetermined number of plies or layers of the tire building material have been applied to the tire forming core or mandrel, it is necessary to apply bead forming rings to the edges of these layers, and my present improvements include simple and convenient means whereby these bead forming rings may be supported by the traveling carriage in which the core is mounted so that they can be easily and quickly applied without necessitating the removal of the carriage from the track rails upon which it travels. As one practical example of this bead ring supporting means, I have herein shown a spider or multi-armed supporting member 40 associated with each of the core clamping heads. This supporting member at one of its ends is provided with a plurality of arms 41 each terminating in a suitably formed seat 42 for the bead ring indicated at B. At its other end the member 40 is formed with a weight 43 which is suitably recessed to receive a reduced section 27' of the hub 27 on one of the core clamping heads. A complementary weight member 44 is adapted to be arranged upon the opposite side of said reduced portion of the hub, said weights being connected together above and below the hub by suitable bolts indicated at 45. It will be noted that the greater portions of the weights 43 and 44 are positioned below the hub of the core clamping head, and said weight sections are loosely held upon the hubs for free swinging movement. Thus it will be understood that in the rotational movement of the core and the clamping heads, the member 40 will remain in a stationary substantially vertical position and the bead ring B carried by said member will, therefore, also remain stationary relative to the core.

Upon the inner side of each of the arms 41 a horizontally disposed bracket lug 46 is formed. These bracket lugs are adapted to receive and support the rings 8, as will be hereinafter explained.

As shown in Figure 3, the heads 36 on the rods 35 are elongated so that they may be passed through the slot 34 and then turned at an angle of 90° to extend crosswise of the slot. However, if desired, I may provide the opposite edges of the slot 34 at one point with opposed notches or recesses 34', through which the rectangular heads on the ends of said bolts may be engaged in the annular channel of the hub 27 or removed therefrom.

Figure 6:
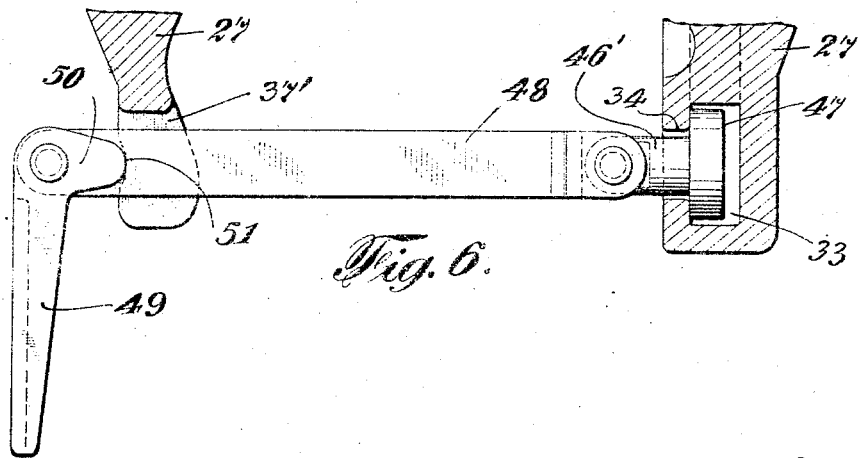
Figures 6, 7 and 8 are detail sectional views through parts of the two clamping heads of the carriage showing various alternative means for detachably connectng said heads with each other.
Figure 7:
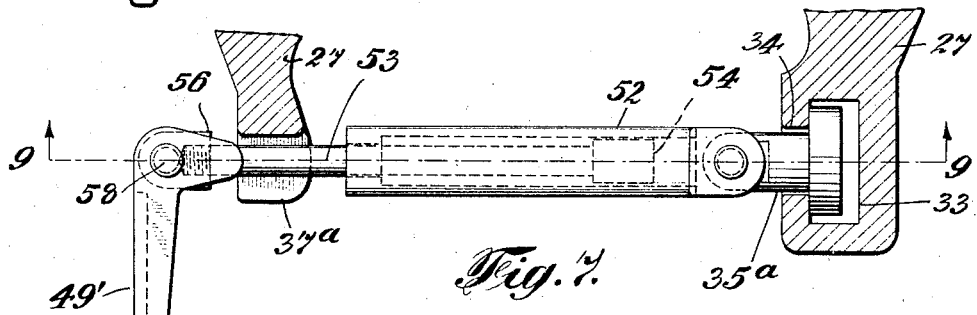
Figure 8:
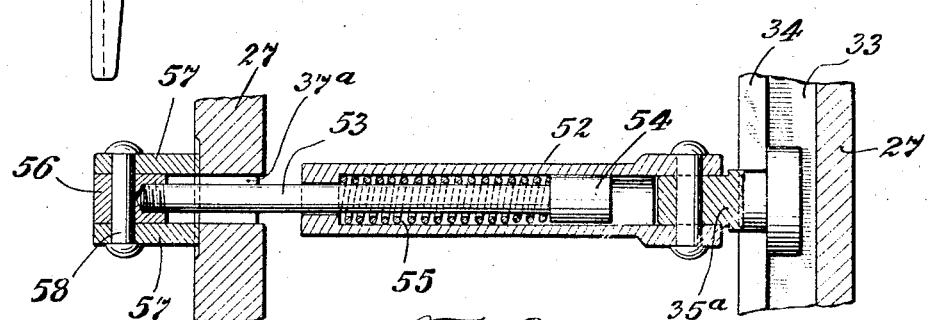

In Figures 6, 7 and 8 of the drawings, I have illustrated several alternative means for detachably clamping the heads against the opposite sides of the core. In each of these cases, the hub 27 is provided with the channel 33 and slot 34 above referred to. In Figure 6 each clamping means includes a relatively short rod 46' having the head 47 on one end engaged in the channel 33 of the clamping head. A bar 48 is pivotally connected to the other end of the rod 35' and is adapted to be engaged in the notch or recess 37' in the hub of the other clamping head. To this end of the bar 48 a lever 49 is pivotally connected, the pivoted end thereof being formed with a cam 50 which is adapted to ride upon the outer face of the hub 27 and engage in a cavity 51 formed therein. It will be readily understood that when the rod 48 is positioned through the recess 37' and the lever swung to the position seen in Figure 6 the two clamping heads will be moved towards each other into clamping engagement with the core or mandrel until the end of the cam 50 seats in the cavity 51 whereby the cam lever is held against casual pivoting movement on the end of the bar 48.

In Figures 7 and 8 I have shown another clamping means which may be employed, wherein one end of a cylinder 52 is pivotally connected to the short rod 35$^a$ and a rod 53 is movable through the other end of said cylinder, said rod being provided with a piston head 54 on its inner end acting against the spring 55 surrounding said rod between the piston head and the end of the cylinder 52. The rod 53 is adapted for engagement in the recess 37$^a$ of the clamping head and is connected to the member 56 disposed between the spaced cam arms 57 formed on the end of the lever 49', said member 56 being loosely held between said cam arms by the bolt 58 extending through an opening in said member and coinciding openings in the arms 57. In this construction, it will be seen that a yielding connection is provided between the two clamping heads. This yielding action permits of a relatively wide range of clamping pressures of the heads against the opposite sides of the core.

From the above description considered in connection with the accompanying drawings, the construction and manner of operation of my invention as herein described will be clearly understood. In the use of my present improvements in connection with the cord tire building machine described in my co-pending application, after the desired number of superposed layers of tire building material have been applied to the core, an attendant stationed at each side of the machine removes one of the bead rings B from the supporting arms 41 and presses the same against the superposed layers of tire material and forces the same inwardly over the outer circumferential sides of the rings 8. These rings 8 are then removed and positioned upon the supporting lugs 46 on the arms 41. The attendant then folds the edges of the several plies or layers of tire building material around the outer sides of the bead rings, after which the movement of the carriage and core through the machine continues and the desired number of additional layers of material are successively applied and their edge portions folded around the bead portions of the previously applied cord layers in the manner disclosed in my co-pending application. It will thus be apparent that by the provision of the bead ring supports it becomes unnecessary to lift the core carriage from the machine in order to apply the bead rings, thus greatly expediting the completion of the tire and reducing manual labor to a minimum.

After the tire has been completed, the inwardly turned flanges 31 of the core clamping heads provide convenient means with which lifting hooks may be engaged so that the heavy core or mandrel with the tire thereon and the carriage may be lifted as a unit from the machine and transported to the desired place where the two sections of the carriage may be disconnected and the core or mandrel removed therefrom. After the core or mandrel has been removed from the carriage, the lifting hooks may be engaged in the groove or channel 14 in the inner side of the core so that the heavy core may be suspended in a horizontal position and conveniently transported to the vulcanizing oven, where the vulcanizing of the tread and side portions of the tire to the superposed plies of tire building material is conducted.

In the foregoing description I have referred to an embodiment of the invention which is believed to be entirely practical for the purpose in view. However, it is anticipated that the desired end might be obtained by means of other alternative structures, and it is accordingly to be understood that I reserve the privilege of resorting to all such legitimate modifications in the form, construction and relative arrangement of the several parts as may be fairly embodied within the spirit and scope of the appended claims.

I claim:

1. A carriage for tire forming cores comprising a pair of core clamping heads, a traveling support for said heads having means on which said heads may freely rotate, and means for moving said heads relative to each other into clamping engagement with the core.

2. In combination with spaced rotatably mounted clamping heads, means on opposite sides of said heads for supporting the same in axial alignment and means for axially moving said heads into clamping engagement with opposite sides of a tire forming core; an independent non-rotatable bead ring supporting member associated with each of said clamping heads to support bead rings between the heads and their supporting means.

3. In combination with spaced clamping heads each having a hub extension, means at opposite sides of said heads for rotatably supporting the same and means for axially moving the heads into clamping engagement with opposite sides of a tire forming core; a bead ring holder loosely mounted upon the hub extension of each of said heads between the heads and their supporting means.

4. A carriage for tire forming cores comprising complementary shaft sections arranged in axial alignment and having their opposed ends telescopically engaged, a wheel revolubly mounted on the other end of each shaft section, a clamping head mounted on each shaft section, and means for detachably connecting said heads with each other to rigidly hold the shaft sections against relative axial movement and clampingly engage said heads with opposite sides of a tire forming core positioned between the same.

5. A device of the class described comprising a shaft supported at opposite ends for traveling movement, clamping heads intermediate the ends of the shaft and rotatable therewith and bead ring supporting means on the shaft at opposite sides of the clamping heads to hold bead rings in encircling position about the shaft between its ends and the clamping heads.

6. In combination with rotatably mounted means for revolubly supporting a tire forming core, said means including relatively movable complementary parts, and means for releasably engaging said parts with a core, a weighted bead ring holder loosely mounted upon each of the core engaging parts and maintaining a relatively stationary position during the rotation thereof.

7. In combination with a rotatably mounted means for revolubly supporting a tire forming core, said means including relatively movable complementary parts, and means for releasably engaging said parts with a core, a bead holder loosely mounted upon each of said core engaging parts and having a counterbalance maintaining said holder in a stationary substantially perpendicular position with respect to said rotatable part.

8. In combination with means for revolubly supporting a tire forming core in a perpendicular position, said means including rotatably mounted heads and means for relatively adjusting said heads along their axes of rotation to position said heads in supporting relation to a tire forming core, said core being provided with detachable parts, and a relatively stationary bead ring holder mounted upon each of said heads and provided with means to receive and support one of the detachable core parts.

9. A carriage for tire forming cores including a pair of relatively movable core clamping heads and means for detachably connecting said heads with each other, each of said heads having an annular rim provided with an inwardly curved flange adapted for engagement by suitable lifting means whereby the carriage and the core may be bodily lifted and transported from place to place.

10. A carriage for tire forming cores including two sections each provided with a supporting wheel, a core clamping head mounted on each carriage section, each of said heads having means for the engagement of lifting hooks therewith whereby the carriage section may be transported from place to place.

11. A carriage for tire forming cores having means for detachably clamping a core in fixed relation to the carriage, and said clamping means having parts adapted for engagement by lifting means to transport said carriage and core from place to place with the core positioned in either a horizontal or a vertical plane.

12. A carriage for tire forming cores including two sections each having a core clamping head and means for detachably connecting the carriage sections and clamping said heads against opposite sides of a tire forming core, each of said clamping heads having parts adapted for engagement by lifting means whereby the carriage section may be transported from place to place with the clamping head positioned in either a horizontal or a vertical plane.

13. A device of the class described comprising a shaft supported at opposite ends, clamping heads intermediate the ends of the shaft and means supporting bead rings in encircling position about the shaft between the ends of the shaft and the clamping heads.

In testimony that I claim the foregoing as my invention, I have signed my name hereto.

KNUT O. B. TEXTORIUS.